(12) United States Patent
Krishan et al.

(10) Patent No.: US 10,616,802 B2
(45) Date of Patent: Apr. 7, 2020

(54) METHODS, SYSTEMS AND COMPUTER READABLE MEDIA FOR OVERLOAD AND FLOW CONTROL AT A SERVICE CAPABILITY EXPOSURE FUNCTION (SCEF)

(71) Applicant: Oracle International Corporation, Redwood Shores, CA (US)

(72) Inventors: Rajiv Krishan, Bangalore (IN); Shashikiran Bhalachandra Mahalank, Bangalore (IN); Raghavendra Gopala Rao, Fountain Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/121,203

(22) Filed: Sep. 4, 2018

(65) Prior Publication Data

US 2020/0077303 A1 Mar. 5, 2020

(51) Int. Cl.
*H04W 28/10* (2009.01)
*H04W 28/02* (2009.01)

(52) U.S. Cl.
CPC ....... *H04W 28/10* (2013.01); *H04W 28/0289* (2013.01)

(58) Field of Classification Search
CPC .................. H04W 28/10; H04W 28/0289
See application file for complete search history.

(56) References Cited

U.S. PATENT DOCUMENTS

| 9,432,150 | B2 | 8/2016 | Jain et al. |
| 9,467,508 | B2 | 10/2016 | Xu |
| 9,621,450 | B2 | 4/2017 | Jeong et al. |
| 10,313,883 | B2 | 6/2019 | Krishan |
| 10,334,419 | B2 | 6/2019 | Aravamudhan et al. |
| 10,405,158 | B2 | 9/2019 | McCann |

(Continued)

FOREIGN PATENT DOCUMENTS

| EP | 3 018 946 A1 | 5/2016 |
| WO | WO 2016/156549 A1 | 10/2016 |

(Continued)

OTHER PUBLICATIONS

Notice of Allowance and Fee(s) Due, Examiner-Initiated Interview Summary, and AFCP 2.0 Decision for U.S. Appl. No. 15/608,595 (dated Aug. 20, 2019).

(Continued)

*Primary Examiner* — Kyaw Z Soe
(74) *Attorney, Agent, or Firm* — Jenkins, Wilson, Taylor & Hunt, P.A.

(57) ABSTRACT

A method for overload and flow control at a service capability exposure function (SCEF) includes providing for configuration of, in memory accessible by the SCEF, at least one of user equipment (UE), service capability server (SCS), application server (AS), and application programming interface (API) gateway specific message priority rules. The method further includes providing for configuration of, in the memory accessible by the SCEF, at least one of SCS, AS, and API gateway capacity information. The method further includes throttling message traffic at the SCEF based on the at least one of UE, SCS, AS, and API gateway specific message priority rules and the at least one of SCS, AS, and API gateway capacity information.

20 Claims, 3 Drawing Sheets

(56) References Cited

U.S. PATENT DOCUMENTS

| | | | |
|---|---|---|---|
| 10,448,449 | B2 | 10/2019 | Aravamudhan et al. |
| 10,506,403 | B2 | 12/2019 | McCann |
| 10,530,599 | B2 | 1/2020 | McCann |
| 2012/0207113 | A1 | 8/2012 | Yoon et al. |
| 2013/0041997 | A1 | 2/2013 | Li et al. |
| 2013/0044596 | A1 | 2/2013 | Zhi et al. |
| 2013/0080782 | A1 | 3/2013 | Rajadurai et al. |
| 2013/0272247 | A1 | 10/2013 | Guo |
| 2013/0336305 | A1 | 12/2013 | Yan et al. |
| 2014/0078968 | A1 | 3/2014 | Korhonen et al. |
| 2014/0086214 | A1 | 3/2014 | Hong et al. |
| 2014/0089442 | A1 | 3/2014 | Kim et al. |
| 2014/0153391 | A1 | 6/2014 | Ludwig et al. |
| 2014/0334386 | A1 | 11/2014 | Fukumasa et al. |
| 2014/0376426 | A1 | 12/2014 | Boudreau et al. |
| 2014/0376454 | A1 | 12/2014 | Boudreau et al. |
| 2015/0036591 | A1 | 2/2015 | Cao et al. |
| 2015/0055459 | A1 | 2/2015 | Wong et al. |
| 2015/0067328 | A1 | 3/2015 | Yin |
| 2015/0111574 | A1 | 4/2015 | Fukumasa et al. |
| 2015/0256440 | A1 | 9/2015 | Jeong et al. |
| 2015/0319172 | A1 | 11/2015 | Zhang et al. |
| 2016/0007138 | A1 | 1/2016 | Palanisamy et al. |
| 2016/0007170 | A1* | 1/2016 | Vaidya .............. H04W 68/02 370/312 |
| 2016/0085594 | A1 | 3/2016 | Wang et al. |
| 2016/0142860 | A1 | 5/2016 | Kim et al. |
| 2016/0277243 | A1 | 9/2016 | Kim et al. |
| 2016/0277530 | A1 | 9/2016 | Jung et al. |
| 2016/0337127 | A1 | 11/2016 | Schultz et al. |
| 2016/0337841 | A1 | 11/2016 | Won et al. |
| 2017/0126512 | A1 | 5/2017 | Seed et al. |
| 2017/0295557 | A1 | 10/2017 | Chamarty et al. |
| 2017/0318570 | A1 | 11/2017 | Shaw et al. |
| 2017/0347283 | A1 | 11/2017 | Kodaypak |
| 2018/0035351 | A1 | 2/2018 | Kodaypak |
| 2018/0092133 | A1 | 3/2018 | Starsinic et al. |
| 2018/0109941 | A1 | 4/2018 | Jain et al. |
| 2018/0124544 | A1 | 5/2018 | Gupta et al. |
| 2018/0234291 | A1* | 8/2018 | Mathison ............ H04L 41/0686 |
| 2018/0241615 | A1 | 8/2018 | Livanos et al. |
| 2018/0248711 | A1 | 8/2018 | McCann |
| 2018/0249281 | A1 | 8/2018 | McCann |
| 2018/0249282 | A1 | 8/2018 | McCann |
| 2018/0263013 | A1 | 9/2018 | Jain et al. |
| 2018/0324671 | A1* | 11/2018 | Palnati ................ H04L 63/0876 |
| 2019/0021121 | A1 | 1/2019 | Aravamudhan et al. |
| 2019/0058962 | A1 | 2/2019 | Aravamudhan et al. |
| 2019/0141527 | A1 | 5/2019 | Krishan |
| 2019/0364064 | A1 | 11/2019 | Gupta et al. |
| 2020/0021965 | A1 | 1/2020 | McCann |

FOREIGN PATENT DOCUMENTS

| | | |
|---|---|---|
| WO | WO 2016/200357 A1 | 12/2016 |
| WO | WO 2017/017879 A1 | 2/2017 |
| WO | WO 2018/156318 A1 | 8/2018 |
| WO | WO 2018/156319 A1 | 8/2018 |
| WO | WO 2018/156320 A1 | 8/2018 |
| WO | WO 2019/014505 A1 | 1/2019 |
| WO | WO 2019/090270 A1 | 5/2019 |

OTHER PUBLICATIONS

Notice of Allowance and Fee(s) Due and AFCP 2.0 Decision for U.S. Appl. No. 15/604,132 (dated Aug. 8, 2019).

Non-Final Office Action for U.S. Appl. No. 15/679,124 (dated Oct. 4, 2018).

Non-Final Office Action for U.S. Appl. No. 15/604,132 (dated Oct. 2, 2018).

Non-Final Office Action for U.S. Appl. No. 15/499,847 (dated Oct. 2, 2018).

Commonly-assigned, co-pending U.S. Appl. No. 15/990,196 for "Methods, Systems, and Computer Readable Media for Detecting and Mitigating Effects of Abnormal Behavior of a Machine Type Communication (MTC) Device," (Unpublished, filed May 25, 2018).

"3rd Generation Partnership Project; Technical Specification Group Services and System Aspects; Architecture enhancements to facilitate communications with packet data networks and applications (Release 15)," 3GPP TS 23.682, V15.5.0, pp. 1-125 (Jun. 2018).

"3rd Generation Partnership Project; Technical Specification Group Services and System Aspects; Architecture enhancements to facilitate communications with packet data networks and applications (Release 15)," 3GPP TS 23.682, V15.4.0, pp. 1-122 (Mar. 2018).

"3rd Generation Partnership Project; Technical Specification Group Services and System Aspects; General Packet Radio Service (GPRS) enhancements for Evolved Universal Terrestrial Radio Access Network (E-UTRAN) access (Release 15)," 3GPP TS 23.401, V15.3.0, pp. 1-405 (Mar. 2018).

"LTE; Evolved Universal Terrestrial Radio Access Network (E-UTRAN); S1 Application Protocol (S1AP) (3GPP TS 36.413 version 14.2.0 Release 14)," ETSI TS 136 413, V14.2.0, pp. 1-349 (Apr. 2017).

Donovan, "Diameter Routing Message Priority," RFC 7944, pp. 1-18 (Aug. 2016).

Notice of Allowance and Fee(s) Due for U.S. Appl. No. 15/679,124 (dated Feb. 12, 2019).

Notification of Transmittal of the International Search Report and the Written Opinion of the International Searching Authority, or the Declaration for International Application Serial No. PCT/US2018/059282 (dated Feb. 11, 2019).

Non-Final Office Action for U.S. Appl. No. 15/649,627 (dated Jan. 23, 2019).

Applicant-Initiated Interview Summary for U.S. Appl. No. 15/499,847 (dated Jan. 22, 2019).

Applicant-Initiated Interview Summary for U.S. Appl. No. 15/604,132 (dated Jan. 22, 2019).

Non-Final Office Action for U.S. Appl. No. 15/608,595 (dated Jan. 8, 2019).

"3rd Generation Partnership Project; Technical Specification Group Core Network and Terminals; Home Subscriber Server (HSS) diameter interfaces for interworking with packet data networks and applications (Release 14)," 3GPP TS 29.336 V.14.1.0, pp. 1-67 (May 2017).

Commonly-assigned, co-pending International Patent Application Serial No. PCT/US18/41911 for "Methods, Systems, and Computer Readable Media for Dynamically Provisioning Session Timeout Information in a Communications Network," (Unpublished, filed Jul. 12, 2018).

Non-Final Office Action for U.S. Appl. No. 15/804,974 (dated May 10, 2018).

Notification of Transmittal of the International Search Report and the Written Opinion of the International Searching Authority, or the Declaration for International Application No. PCT/US2018/016044 (dated Apr. 24, 2018).

Notification of Transmittal of the International Search Report and the Written Opinion of the International Searching Authority, or the Declaration for International Application No. PCT/US2018/016047 (Apr. 24, 2018).

Notification of Transmittal of the International Search Report and the Written Opinion of the International Searching Authority, or the Declaration for International Application No. PCT/US2018/016045 (Apr. 24, 2018).

Commonly-assigned, co-pending U.S. Appl. No. 15/804,974 for "Methods, Systems, and Computer Readable Media for using Authentication Validation Time Periods," (Unpublished, filed Nov. 6, 2017).

"Universal Mobile Telecommunications System (UMTS); LTE; Diameter-based T4 Interface for communications with packet data networks and applications (3GPP TS 29.337 V14.2.0 Release 14)," ETSI TS 129 337 V14.2.0, pp. 1-25 (Oct. 2017).

Commonly-assigned, co-pending U.S. Appl. No. 15/679,124 for "Methods, Systems, and Computer Readable Media for Optimizing Machine Type Communication (MTC) Device Signaling," (Unpublished, filed Aug. 16, 2017).

(56) References Cited

OTHER PUBLICATIONS

Commonly-assigned, co-pending U.S. Appl. No. 15/649,627 for "Methods, Systems, and Computer Readable Media for Dynamically Provisioning Session Timeout Information in a Communications Network," (Unpublished, filed Jul. 13, 2017).
"Universal Mobile Telecommunications System (UMTS); LTE; Evolved Packet System (EPS); Mobility Management Entity (MME) and Serving GPRS Support Node (SGSN) related interfaces based on Diameter protocol (3GPP TS 29.272 V14.4.0 Release 14)," ETSI TS 129 272 V14.4.0, pp. 1-171 (Jul. 2017).
"Universal Mobile Telecommunications System (UMTS); LTE; Home Subscriber Server (HSS) diameter interfaces for interworking with packet data networks and applications (3GPP TS 29.336 V14.1.0 Release 14)," ETSI TS 129 336 V14.1.0, pp. 1-66 (May 2017).
"Digital cellular telecommunications system (Phase 2+) (GSM); Universal Mobile Telecommunications System (UMTS); LTE; Circuit Switched (CS) fallback in Evolved Packet System (EPS); Stage 2 (3GPP TS 23.272 V14.0.0 Release 14)," ETSI TS 123 272 V14.0.0, pp. 1-105 (May 2017).
"LTE; General Packet Radio Service (GPRS) enhancements for Evolved Universal Terrestrial Radio Access Network (E-UTRAN) access (3GPP TS 23.401 V14.3.0 Release 14)," ETSI TS 123 401 V14.3.0, pp. 1-392 (May 2017).
"Universal Mobile Telecommunications System (UMTS); LTE; Tsp interface protocol between the MTC Interworking Function (MTC-IWF) and Service Capability Server (SCS) (3GPP TS 29.368 V14.1.0 Release 14)," ETSI TS 129 368 V14.1.0, pp. 1-34 (Apr. 2017).
"3rd Generation Partnership Project; Technical Specification Group Services and System Aspects; Architecture enhancements to facilitate communications with packet data networks and applications (Release 15)," 3GPP TS 23.682 V15.0.0, pp. 1-109 (Mar. 2017).
"3rd Generation Partnership Project; Technical Specification Group Services and System Aspects; Architecture enhancements to facilitate communications with packet data networks and applications (Release 14)," 3GPP TS 23.682, V14.2.0, pp. 1-104 (Dec. 2016).
"Change Request," InterDigital, Meeting ARC#25, Doc# ARC-2016-0439-TS-0026_sec5_sec6.1, pp. 1-16 (Oct. 17, 2016).
Abu-Lebdeh et al., "A Virtual Network PaaS for 3GPP 4G and Beyond Core Network Services," pp. 1-7 (Aug. 20, 2016).
"Universal Mobile Telecommunications System (UMTS); Mobility Management Entity (MME) and Serving GPRS Support Node (SGSN) interfaces for internvorking with packet data and applications (3GPP TS 29.128 V13.0.0, Release 13)," ETSI TS 129.128 V13.0.0, pp. 1-40 (May 2016).
"Universal Mobile Telecommunications System (UMTS); LTE; Home Subscriber Server (HSS) diameter interfaces for interworking with packet data networks and applications (3GPP TS 29.339 version 13.3.0 Release 13)," ETSI TS 129 336 V13.3.0, pp. 1-56 (Apr. 2016).
"3rd Generation Partnership Project; Technical Specification Group Services and System Aspects; Architecture enhancements to facilitate communications with packet data networks and applications (Release 13)," 3GPP TS 23.682 V13.5.0, pp. 1-90 (Mar. 2016).
"Digital cellular telecommunications system (Phase 2+) (GSM); Universal Mobile Telecommunications System (UMTS); LTE; Architecture enhancements to facilitate communications with packet data networks and applications (3GPP TS 23.682 V13.4.0 Release 13)," ETSI TS 123 682 V13.4.0, pp. 1-82 (Mar. 2016).
"Universal Mobile Telecommunications System (UMTS); LTE; Home Subscriber Server (HSS) diameter interfaces for interworking with packet data networks and applications (3GPP TS 29.336 V13.2.0 Release 13)," ETSI TS 129.336 V13.2.0, pp. 1-48 (Mar. 2016).
"Routing Non-IP Data to/from Multiple UE Applicatons and Multiple SCS/AS'S," Convida Wireless, 3FPP TSG-SA WG2 #113AH pp. 1-6 (Feb. 2016).
"Cloud Innovation Solution," ZTE Corporation, pp. 1-31 (2016).
Taleb et al., "EASE: EPC as a Service to Ease Mobile Core Network Deployment over Cloud," IEEE Network, pp. 78-88 (Mar./Apr. 2015).
"Universal Mobile Telecommunications System (UMTS); LTE; TSP interface protocol between the MTC Interworking Function (MTC-IWF) and Service Capability Server (SCS) (3GPP TS 29.368 V12.2.0 Release 12)," ETSI TS 129.368 V12.2.0, pp. 1-29 (Oct. 2014).
Mendyk, "NFV + SDN—network in the cloud or cloud in the network?," NFV/IT Transformation, pp. 1-3 (Oct. 7, 2014).
Taleb et al., "Virtualizing the LTE Evolved Packet Core (EPC)," Proc. European Conf. on Networks and Communications (EUCNC), pp. 1-2 (Jun. 2014).
Fajardo et al., "Diameter Base Protocol," RFC 6733, pp. 1-152 (Oct. 2012).
"Digital cellular telecommunications system (Phase 2+); Universal Mobile Telecommunications System (UMTS); LTE; Service requirements for Machine-Type Communications (MTC); Stage 1 (3GPP TS 22.368 V11.6.0 Release 11)," ETSI TS 122 368 V11.6.0, pp. 1-20 (Sep. 2012).
Notice of Allowance and Fee(s) Due for U.S. Appl. No. 15/804,974 (dated Nov. 13, 2018).
Notification of Transmittal of the International Search Report and the Written Opinion of the International Searching Authority, or the Declaration for International Application Serial No. PCT/US2018/041911 (dated Oct. 12, 2018).
Notice of Allowance and Fee(s) Due for U.S. Appl. No. 15/649,627 (dated May 30, 2019).
Final Office Action for U.S. Appl. No. 15/608,595 (dated Apr. 29, 2019).
Applicant-Initiated Interview Summary for U.S. Appl. No. 15/608,595 (dated Apr. 22, 2019).
Notice of Allowance and Fee(s) Due for U.S. Appl. No. 15/499,847 (dated Apr. 17, 2019).
Final Office Action for U.S. Appl. No. 15/604,132 (dated Apr. 16, 2019).
Commonly-assigned, co-pending U.S. Appl. No. 16/575,962 for "Methods, Systems and Computer Readable Media for Providing Integrated Service Capability Exposure Function (SCEF), Service Capability Server (SCS) and Application Server (AS) Services," (Unpublished, filed Sep. 19, 2019).

* cited by examiner

METHODS, SYSTEMS AND COMPUTER READABLE MEDIA FOR OVERLOAD AND FLOW CONTROL AT A SERVICE CAPABILITY EXPOSURE FUNCTION (SCEF)

TECHNICAL FIELD

The subject matter described herein relates to providing overload control in telecommunications networks. More particularly, the subject matter described herein relates to methods, systems, and computer readable media for overload and flow control at an SCEF.

BACKGROUND

For Internet of things (IoT) deployments, there can be millions or billions of IoT devices that send data towards a service capability server (SCS) or an application server (AS). For example, IoT devices, such as sensors, can initiate a data transfer based on a particular time or event. When multiple IoT devices transmit at the same time or in response to the same event, a traffic storm at the SCS or AS that receives the traffic can occur. A traffic storm at an SCS or AS can lead to temporary unavailability of the SCS or AS. In another example, a traffic storm can overwhelm the resources of an application programming interface (API) node of an SCEF that sends notification messages to SCSs or ASs. If the API interface to an SCS or AS becomes overwhelmed with traffic, the service provided by the SCS or AS is likewise unavailable.

In another example, a single misbehaving IoT device may lead to traffic storms at an SCS, AS or API interface. For example, if an IoT device is either intentionally or unintentionally malfunctioning, such a device can lead to a traffic storm in an operator's network. The malfunctioning IoT device may repeatedly send messages to the API, the SCS, or the AS, which can lead to unavailability of services provided by such nodes.

In order to protect against traffic storms, overload control can be provided at network elements, such as the eNode B, mobility management entity (MME), serving general packet radio service (GPRS) support node (SGSN), etc. However, providing flow control at these nodes can be inefficient due to their distributed location in the network. For example, implementing a flow control solution at every eNode B in the network may be cost prohibitive due to the number of eNode Bs in the network. Also, even if a network operator applies overload control at individual network components, the SCEF may be receiving data from such multiple nodes e.g., MME/SGSN. Thus upstream SCS/AS servers could still be adversely affected.

Another problem that exists in some flow control solutions is the inability to provide fine grained flow control. For example, some traffic storms may only affect a single SCS or AS, and it may be desirable to implement flow control specific to that SCS or AS, given its capacity. Within an SCS or AS, it may also be desirable to provide high priority service to particular users, such as emergency personnel. Flow control solutions that are not specific to an SCS or AS may not allow for SCS or AS capacity specific throttling of messages or selective prioritization of messages associated with high priority users.

In light of these and other difficulties, there exists a need for methods, systems, and computer readable media for overload and flow control at an SCEF.

SUMMARY

A method for overload and flow control at a service capability exposure function (SCEF) includes providing for configuration of, in memory accessible by the SCEF, at least one of user equipment (UE), service capability server (SCS), application server (AS), and application programming interface (API) gateway specific message priority rules. The method further includes providing for configuration of, in the memory accessible by the SCEF, at least one of SCS, AS, and API gateway capacity information. The method further includes throttling message traffic at the SCEF based on the at least one of UE, SCS, AS, and API gateway specific message priority rules and the at least one of SCS, AS, and API gateway capacity information.

A system for overload and flow control includes an SCEF including at least one message processor for receiving messages destined for a service capability server (SCS) or an application server (AS) and at least one message processor implementing an application programming interface (API) gateway for the SCS or AS. The SCEF further includes a congestion controller for providing for configuration of, in memory accessible by the SCEF, at least one of user equipment (UE), SCS, AS, and API gateway specific message priority rules, providing for configuration of, in the memory accessible by the SCEF, at least one of SCS, AS, and API gateway capacity information, and throttling message traffic at the SCEF based on the at least one of UE, SCS, AS, and API gateway specific message priority rules, and the at least one of SCS, AS, and API gateway capacity information.

The subject matter described herein may be implemented using a non-transitory computer readable medium having stored thereon executable instructions that when executed by a processor of a computer control the computer to perform steps. Computer readable media suitable for implementing the subject matter described herein include non-transitory media, such as disk memory devices, chip memory devices, programmable logic devices, random access memory (RAM), read only memory (ROM), optical read/write memory, cache memory, magnetic read/write memory, flash memory, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

Figure 1:
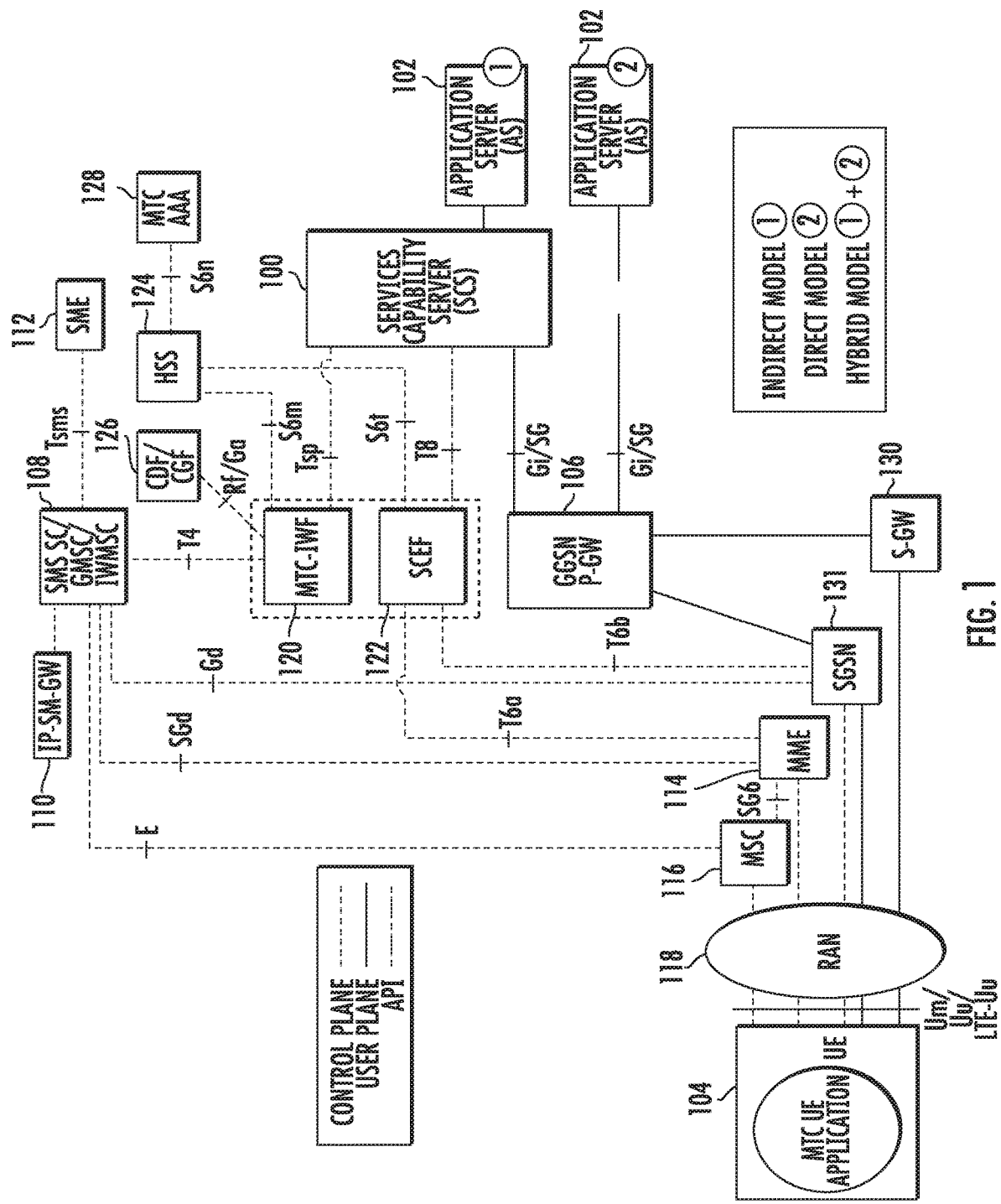
FIG. 1 is a network diagram illustrating a third generation partnership project (3GPP) architecture for machine type communications (MTC)

FIG. 1 is a block diagram illustrating an exemplary architecture defined in Third Generation Partnership Project (3GPP) TS 23.682, V15.5.0, June 2018, the disclosure of which is incorporated herein by reference in its entirety, for machine type communications. Referring to FIG. 1, the architecture includes an SCS 100 that hosts one or more as 102 that deliver trigger messages to a UE 104 with a machine type communications (MTC) UE application. The MTC UE application enables UE 104 to function as an IoT device, such as a sensor, and communicate sensor data to the network. Hereinafter, UE 104 with the MTC application will be referred to as IoT device 104. The architecture where application servers deliver trigger messages to UEs via an SCS is referred to in 3GPP TS 23.682 as the indirect delivery model. In an alternate architecture, an application server 102 may deliver trigger messages to IoT device 104 via a gateway GPRS support node (GGSN) or packet gateway (PGW) 106 without going through a service capability server. This method is referred to in 3GPP TS 23.682 as the direct model.

In either case, according to 3GPP TS 23.682, SMS messages are delivered by a message service center, which is illustrated in FIG. 1 as short message service-service center/gateway message service center/inter-working message service center (SMS-SC/GMSC/IWMSC) 108 (hereinafter, SMS-SC 108). SMS-SC 108 is the node responsible for delivering SMS messages to IoT devices. An Internet protocol short message gateway (IP-SM-GW) 110 may support delivery of SMS messages via an Internet protocol network. A short message entity (SME) 112 may communicate with SMS-SC 108 over a $T_{SMS}$ interface.

In order to deliver SMS messages to IoT device 104, SMS-SC 108 communicates with either a mobility management entity (MME) 114 or mobile switching center (MSC) 116. MME 114 or MSC 116 communicates with IoT device 104 via the radio access network (RAN) 118.

Also illustrated in FIG. 1 is the machine type communications-interworking function (MTC-IWF) 120 and SCEF 122. MTC-IWF 120 performs interworking functions to allow applications, such as applications hosted on application servers 102 to communicate with IoT devices. SCEF 122 likewise facilitates communication between applications and IoT devices, such as IoT device 104. MTC-IWF 120 and SCEF 122 communicate with home subscriber server (HSS) 124 to obtain serving identity identification information for IoT devices. MTC-IWF 120 may also communicate with a charging data function (CDF) 126 to obtain charging information for IoT devices. HSS 124 may communicate with a machine type communication authentication, authorization, and accounting (MTC-AAA) function 128 to authenticate IoT devices and perform accounting for transactions involving IoT devices. A serving gateway (S-GW) 130 and a serving general packet radio service support node (SGSN) 131 facilitate packet communications with IoT devices.

In the architecture illustrated in FIG. 1, if IoT device 104 misbehaves or if hundreds, thousands, or millions of IoT devices 104 simultaneously transmit messages to application servers 102, SCS 100 and/or ASs 102 can be overwhelmed. In order to avoid or reduce the effect of a traffic storm on a network, SCEF 122 may be provisioned with flow control and overload control capabilities as described herein.

To provide flow control for SCS or AS, the SCEF needs to consider the following:
1. Each SCS/AS may have different capacity. Thus, the SCEF allows the operator to specify the capacity of the SCS or AS node.
2. If multiple SCSs or as are connected to the SCEF, the operator may want to assign priorities to each of the SCSs or ASs. The priorities may help determine how messages are handled by the flow control algorithms.
3. Even within an SCS/AS, there may exist users that require high priority handling during overload or flow control. The SCEF should allow the operator to define such users and their priorities for each SCS/AS.

Figure 2:
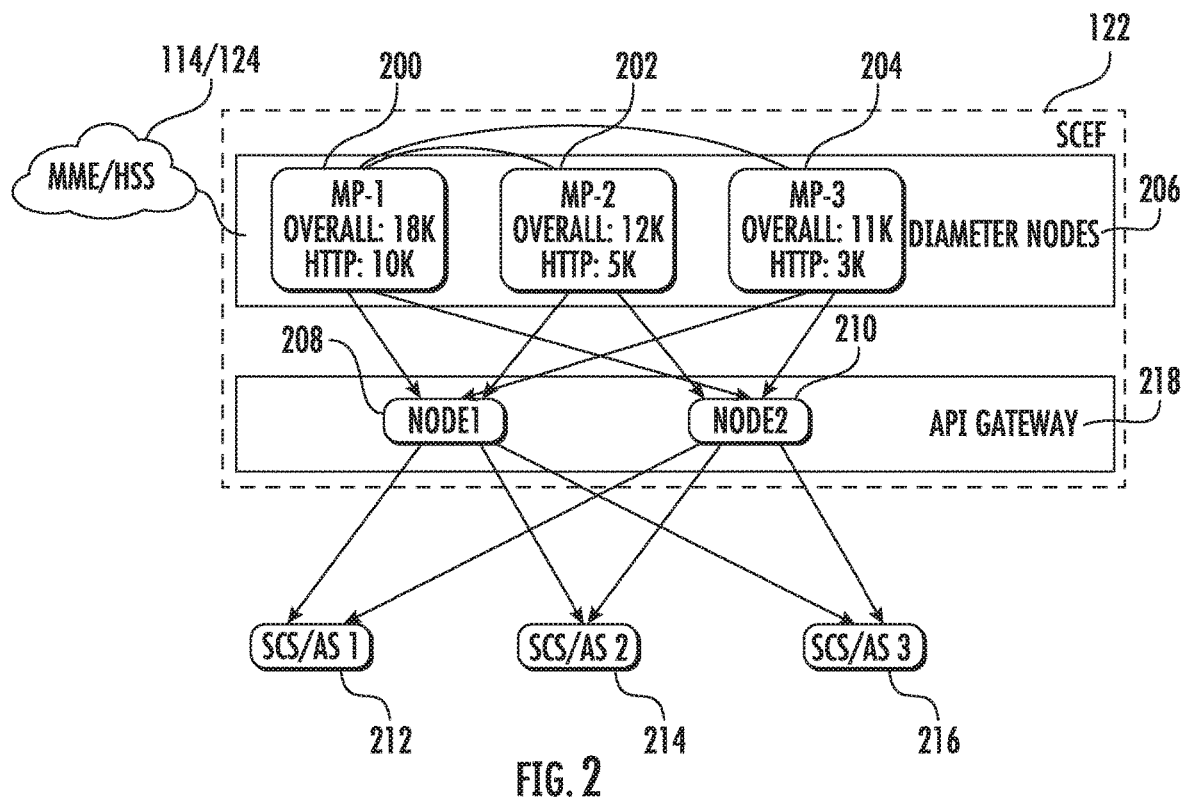
FIG. 2 is a block diagram illustrating and an SCEF deployment architecture.

To illustrate the functionality of the subject matter described herein, a SCEF deployment model will be used. FIG. 2 is a block diagram illustrating an exemplary SCEF deployment model. In FIG. 2, SCEF 122 includes message processors MP1-MP3 200, 202, and 204 that perform Diameter message handling functions of the SCEF. Such functions include communicating with MME/HSS 114/124. The Diameter message traffic includes notification messages from IoT devices. Each message processor 200, 202, and 204 comprises a printed circuit board with one or more processors and a memory mounted on the printed circuit board. Because message processors 200, 202, and 204 process Diameter messages, message processors 200, 202, and 204 are considered Diameter nodes 206.

SCEF 122 may provide for configuration of the data illustrated in the tables described herein to facilitate overload control at the SCEF. For example, the tables described herein may be stored in memory of the SCEF and may be configurable by a user so that SCEF 122 can implement overload control in accordance with the user-configured rules. Examples of data that may be configured is described below with respect to Tables 1-4.

SCEF 122 also includes node 1 208 and node 2 210 that provide API gateway services to SCS/AS 1, SCS/AS 2, and SCS/AS 3 212, 214, and 216. Because node 1 208 and node 2 210 provide API interfaces to SCS/AS 212, 214, and 216, node 1 208 and node 2 210 can be considered an API gateway 218. Node 1 208 and node 2 210 may also be implemented on message processors, each of which include a printed circuit board and one or more processors.

As stated above, SCEF 122 may allow configuration of priority assignments for each SCS or AS supported by the SCEF. Table 1 shown below illustrates exemplary priority assignments that may be implemented within SCEF 122.

TABLE 1

SCS/AS Feature to Priority Mapping

| Priority Level | SCS1 | SCS2 | SCS3 |
|---|---|---|---|
| P0 | | | |
| P1 | | | DT (Discard) |
| P2 | | | |
| P3 | | | |
| P4 | | MONTE (DISCARD) | MONTE (DISCARD) |
| P5 | | | |
| P6 | NIDD (Buffer) | | |
| P7 | | | |
| P8 | | | NIDD (Buffer) |
| P9 | | | |
| P10 | DT (Discard) | ECR (BUFFER) | |
| P11 | | | |
| P12 | | NIDD (Buffer) DT (Buffer) | ECR (BUFFER) |
| P13 | MONTE (DISCARD) ECR (BUFFER) | | |
| P14 | | | |
| P15 | | | |

In Table 1, the first column corresponds to priority with P0 being the highest priority and P15 being the lowest priority. Columns 2, 3, and 4 correspond to SCSs 1, 2, and 3 (212, 214, and 216 illustrated in FIG. 2). Referring to column 2, SCEF 122 may be configured such that SCS 1 212 has non-Internet protocol (IP) data delivery (NIDD) traffic set to priority level P6, device triggering (DT) traffic set to priority level P10 with the action of discard. SCEF 122 is further configured such that SCS 1 212 has monitoring (MONTE) traffic set to priority level P13 with the action specified as discard. SCEF 122 is further configured such that SCS 1 212 has the enhanced coverage restriction (ECR) traffic also set to priority level P13 with the specified action of buffer.

For SCS 2 214, SCEF 122 is configured such that monitoring traffic is set to priority level P4 with the action specified as discard. SCEF 122 is further configured such that SCS 2 214 has ECR traffic set to priority level P10 with a specified action of buffer.

For SCS 3 216, SCEF 122 has the device triggering action set to priority level P1 with an action of discard. SCEF 122 is further configured such that SCS 3 214 has monitoring traffic set to a priority level of P4 with the corresponding action of discard. For SCS 3 214, SCEF 122 has NIDD traffic set to priority level P9 with a corresponding action of buffer. SCEF 122 is further configured such that SCS 3 214 has ECR traffic set to priority level P12 with a specified action of buffer.

As will be described in more detail below, SCEF 122 may utilize the priority configuration data for each SCS or AS to determine how to treat different types of traffic on a per SCS or AS basis in the event of a traffic storm. Providing for configuration of message priorities on a per SCS or AS basis enables fine grain priority control tailored to the functionality of each specific SCS or AS. Such tailored flow control allows SCS and AS resources to be used more efficiently.

Additional priority parameters that may be configured to facilitate flow control in SCEF 122 includes:

If Diameter routing message priority (DRMP) is enabled, the DRMP priority from Table 1 above (based on the SCS/AS) and the requested feature (e.g., NIDD, monitoring, etc.) will be used to populate the DRMP AVP in ongoing Diameter requests. Otherwise the DRMP AVP will be used for notification flow/overload control only. If a Diameter request or answer message has DRMP priority, then the corresponding HTTP message will use the DRMP priority for notification flow/overload control.

The priority levels in Table 1 are consistent with DRMP priority values specified in Internet Engineering Task Force (IETF) Request for Comments (RFC) 7944, Diameter Message Routing Priority, August 2016, the disclosure of which is incorporated herein by reference in its entirety. However, the subject matter described herein is not limited to using DRMP priority values to prioritize different types of messages. Any suitable priority scheme can be used to identify the relative priorities of different message types. In addition, different priority schemes may be used within different SCSs or ASs. In addition, Table 1 lists priorities on a per SCS basis. Priorities may also be defined on a per AS basis. That is SCEF 122 may be configurable to allow different priority schemes to be assigned on a per AS basis.

When a hypertext transfer protocol (HTTP) message is received by SCEF 122 on the T8 interface, SCEF 122 will, based on the rules in Table 1, assign local priority as well as DRMP priority to the corresponding message. In Table 1, the buffer/discard indicator indicates the handling of the message when an overload condition is detected. Buffer indicates that messages for this group should be buffered and relayed when overload/congestion abates. Discard indicates that the notification message can be rejected during an overload condition.

In addition to providing for configuration of priority rules on a per AS or per SCS basis, SCEF 122 may also provide for configuration of priority rules on a per UE device or per UE device group basis. Table 2 shown below illustrates UE specific priority rules that may be implemented on SCEF 122.

TABLE 2

SCS/AS UE to Priority Mapping

| ScsAsId | MSISDN/ExternalId | Range | APN | DRMP Priority | Features | Discard/Buffer |
|---|---|---|---|---|---|---|
| SCS1 | ExternalId | *oracle.com | — | — | Monitoring | Discard/card/ |
| SCS1 | ExternalId | abc.oracle.com | APN1 | — | Monitoring | Discard/card/ |
| SCS1 | ExternalId | abc.oracle.com | APN1 | 15 | NIDD | Discard/card/ |
| SCS2 | MSISDN | 113456789-1234567890 | APN1 | 2 | NIDD | Discard/card/ |
| SCS2 | MSISDN | 1134567890-1234567890 | APN1 | — | Monitoring | Discard/card/ |
| SCS2 | ExternalId | *def.oracle.com | APN2 | — | NIDD | Buffer |
| SCS2 | ExternalId | *xyz.oracle.com | APN3 | 11 | NIDD | Buffer |
| SCS2 | ExternalId | *xyz.oracle.com | — | 6 | Monitoring | Discard/card/ |
| SCS3 | MSISDN | 1134567890-1234567890 | APN2 | — | NIDD | Buffer |
| SCS3 | ExternalId | *def.oracle.com | APN3 | 8 | NIDD | Discard/card/ |
| SCS3 | MSISDN | 2134567890-2234567890 | Default | — | Monitoring | Buffer |

In Table 2, the first column identifies the SCS or AS to which the message is destined. The second column includes whether the rule corresponds to a mobile subscriber integrated services digital network (MSISDN) number or an external identifier. The third column includes the MSISDN, MSISDN range, external identifier, or external identifier range corresponding to the UE device or UE device group to which the rule is directed. The fourth column specifies the access point name (APN), which is an additional rule parameter that allows messages from different access points to be treated differently. The fifth column contains the DRMP priority. In the fifth column, "--" indicates that the default priority is set for the SCS/AS. This allows the SCEF to assign priority for a defined set of users, i.e., for premium users on a given SCS/AS, the SCEF can assign a higher priority. The sixth column defines the message type or feature type. The seventh column specifies the flow control action defined for messages matching the particular rule.

Figure 3:
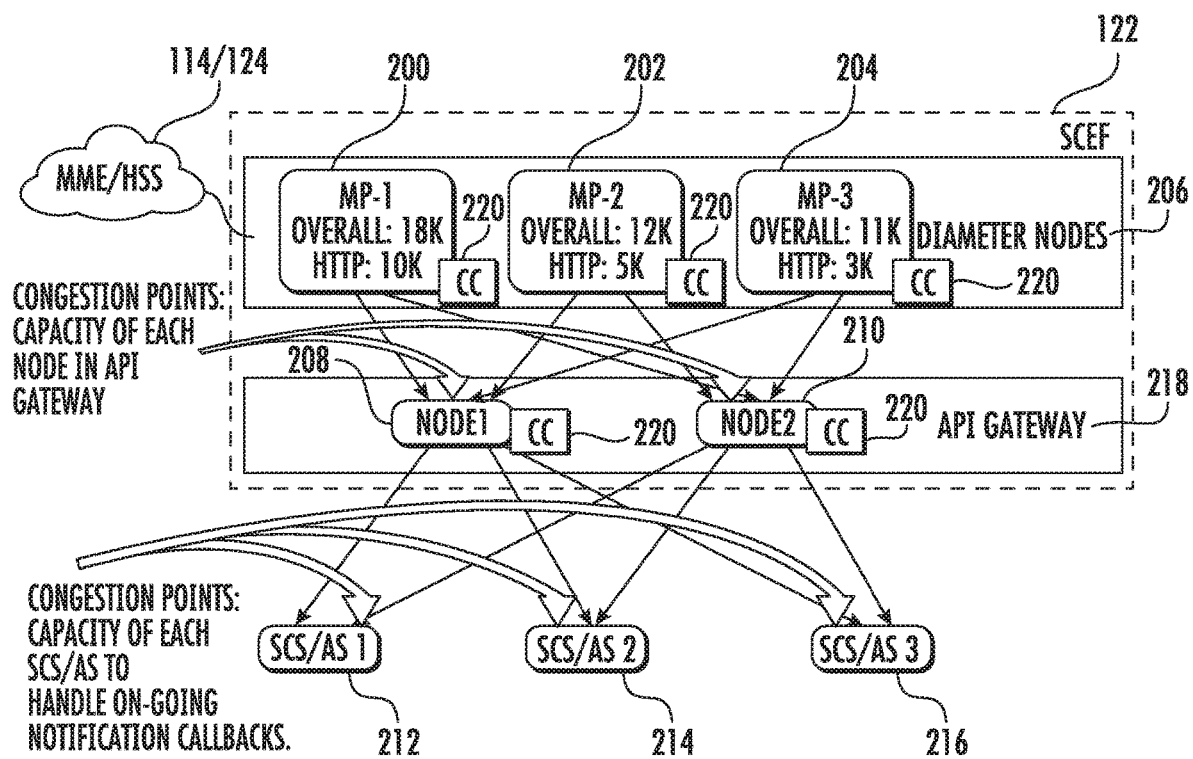
FIG. 3 is a block diagram illustrating SCEF congestion points for messages received on a T8 interface.

FIG. 3 illustrates an example of overload control performed by the SCEF architecture illustrated in FIG. 2. Referring to FIG. 3, SCEF 122 can experience congestion based on the congestion capacity of nodes 208 and 210 and API gateway 218. SCEF 122 can also experience congestion based on the capacity of each SCS/AS 212, 214, or 216 to handle ongoing notification callbacks.

In order to account for and mitigate such congestion, SCEF 122 may include a congestion controller (CC) 220 implemented on message processors 200, 202, and 204. CC 220 may track the following:

1. The number of HTTP requests/notification messages sent by and to API gateway 218; and
2. The number of notification messages sent to each SCS/AS 212, 214, and 216.

If there are multiple active servers performing load balancing in Diameter portion 206 of SCEF 122, then a mechanism is required to aggregate the API as well as the individual SCS/AS flow control data. In addition to tracking the utilization of nodes 208, 210 as well as SCS/AS 212, 214, and 216, CC 220 may also store capacity information regarding nodes 208 and 210 and SCS/ASs 212, 214, and 216. The need to store capacity information regarding each API gateway node and each SCS/AS can facilitate the proper overload and flow control operations performed by CC 220.

In addition to storing capacity information for API gateway 218 and SCS/AS 212, 214, and 216, CC 220 may also store or define threshold limits for each congestion point. Table 3 illustrates an example of threshold limits that may be configured and stored by each CC 220.

TABLE 3

Capacity and Threshold Limit per API Gateway Node and SCS/AS

|  | API Gateway | SCSAS1 | SCSAS2 |
| --- | --- | --- | --- |
| Nodal Capacity | 100K | 10K | 15K |
| Threshold level 1: 60% | 60K | 6K | 9K |
| Threshold level 2: 80% | 80K | 8K | 12K |
| Threshold level 3: 90% | 80K | 9K | 13.5K |
| Threshold level 4: 100% | 100K | 10K | 15K |

In Table 3, the first column indicates four different threshold levels, which are defined as 60%, 80%, 90%, and 100% of threshold capacity. The second column stores nodal capacity per API gateway node. In the illustrated example, the API gateway node includes a capacity defined for each threshold level in terms of number of messages. For example, total nodal capacity of API gateway 218 is 100K messages. Thus, the threshold in messages for threshold level 1 is 60K messages. The threshold in messages for API gateway 218 for threshold level 2 is 80K messages. The threshold in messages for API gateway 218 for threshold level 3 is 90K messages. The threshold in messages for API gateway 218 for threshold level 4 is a 100K messages. For SCS/AS 1, the nodal capacity is 10K messages. Accordingly, the threshold in messages for threshold level 1 is 6K messages. The threshold for SCS/AS 1 for threshold level 2 is 8K messages. The threshold for SCS/AS 1 for threshold level 3 is 9K messages. The threshold of SCS/AS 1 for threshold level 4 is 10K messages.

It should be noted that SCS/AS 2 includes a different nodal capacity than SCS/AS 1. In the illustrated example, the nodal capacity of SCS/AS 2 is 15K messages whereas the nodal capacity for SCS/AS 1 is 10K messages. Accordingly, for threshold level 1, the threshold in messages defined for SCS/AS 2 is 9K messages. The threshold in messages defined for SCS/AS 2, threshold level 2 is 12K messages. The threshold in messages defined for threshold level 3 for SCS/AS 2 is 13.5K messages. The threshold in messages defined for SCS/AS 2 for threshold level 4 is 15K messages. Thus, by being configured with the capacities of each SCS, AS, and API gateway node, SCEF 122 can more properly allocate load among the various nodes within and served by SCEF 122.

SCEF 122 and more particularly CC 220 may map each threshold level to throttle priorities, where the throttle priorities indicate message priority levels that are subject to flow control. Table 4 illustrates exemplary threshold levels and corresponding throttle priorities that may be configured with an SCEF 122.

TABLE 4

Threshold to Priority Mapping

| Threshold Level | Throttle Priority |
| --- | --- |
| Threshold level 1 | P12-P15 |
| Threshold level 2 | P9-P15 |
| Threshold level 3 | P4-P15 |
| Threshold level 4 | P0-P15 |

In Table 4, each threshold level is mapped to a range of different throttle priorities, which define which message priority levels will be subject to flow control. For example, threshold level 1 maps to throttle priorities P12-P15 indicating that message priority levels P12-P15 will be subject to flow control. The mapping between priority levels and messages types for each SCS or AS is illustrated in Table 1. For example, if threshold level 1 is reached, for SCS 1 212, there are no message types defined with priority levels P14 and P15. SCS has monitoring and ECR traffic assigned to priority level P13, with corresponding actions of discard and buffer, respectively. Accordingly, monitoring traffic will be discarded and ECR traffic will be buffered if threshold level 1 is crossed. If threshold level 1 is crossed, for SCS 2 214, DT and NIDD traffic will be buffered. For SCS 3 216, if threshold level 1 is crossed, ECR traffic will be buffered. In addition, as illustrated in Table 3, the threshold levels may be different amounts of messages for different SCSs. Thus, using the configured priority levels, capacities, and threshold level to throttle priority mappings, messages of different types can be treated differently during overload conditions on a per UE, SCS, AS, or API basis.

Returning to Table 2, threshold level 2 maps to priority levels P9-P15, indicating that messages with priority levels P9-P15 will be subject to flow control. In Table 3, threshold level 2 indicates that the API gateway or node has reached 80% of its configured capacity. In Table 1, for SCS 1, if threshold level 2 is reached, monitoring traffic will be discarded. ECR traffic will be buffered, and DT traffic will be discarded. For SCS 2, when threshold level 2 is reached, DT traffic will be buffered, NIDD traffic will be buffered, and ECR traffic will be buffered. For SCS 3 216, ECR traffic will be buffered.

Threshold level 3 maps to priority levels P6-P15, indicating that messages with priority levels P6-P15 will be subject to flow control. In Table 1, for SCS 1, if threshold level 3 is reached, ECR traffic will be buffered, monitoring traffic will be discarded, DT traffic will be discarded, and NIDD traffic will be buffered. For SCS 2, if threshold level 3 is reached, DT traffic will be buffered, NIDD traffic will be buffered, ECR traffic will be buffered, and monitoring traffic will be discarded. For SCS 3, if threshold level 2 is reached, ECR traffic will be buffered, NIDD traffic will be buffered, and monitoring traffic will be discarded. Threshold level 4 maps to priorities P15-P0, which means that all messages will be subject to flow control.

To properly implement flow control based on API gateway capacity, SCEF 122 must consider messages arriving on the T6a and T6b interfaces that are destined for an SCS and/or an AS as well as messages received from an SCS on the T8 interface. SCEF 122 may implement the following processing logic for incoming messages received on the T8 interface:

1. Instantiate a counter to track API gateway load level;
2. When a message is received on the T8 interface, Increment the counter maintained to track the API gateway load level;

3. The SCEF will look into the T8 message and authenticate it based on a local profile; and As illustrated in Table 2, look for any matching UE. If a UE is found, use the DRMP priority when sending the Diameter message to the HSS/MME/SGSN. If a record is not found, then use SCS to which the message is destined to find the default priority to set the DRMP priority of the outbound Diameter message. For example, if a message is directed to a UE with a MSISDN within the range 1134567890-1234567890, the record could match row 5, row 6, or row 11 in Table 2. If the message is from SCS 2, the message could match row 5 or row 6 but not row 11. If the message is an NIDD message, the only matching record is row 5. Accordingly, the DRMP priority for the outbound Diameter message will be set to priority level 2. If the message does not match with any record in Table 2, then Table 1 is consulted to find a matching row for the requested SCS+ feature, e.g. SCS1+NIDD. Based on the match, a priority value will be specified. If there is no match in Table 1 as well, then the Diameter message will be sent out with a default priority level.

For notification messages directed to the T8 interface, SCEF 122 may implement the following steps:
1. If the Diameter request/answer contains a DRMP attribute value pair (AVP), then assign that priority to the T8 notification message being sent to the SCS/AS;
2. On timely basis (ideally 100 ms), calculate the traffic rate and threshold level of API Gateway and SCS/AS server(s);
3. Based on the configured threshold level of API gateway and the priority of the notification message, perform a check if message is allowed to pass through the API gateway.
    Note: Determining whether a message is allowed at a configured threshold level is implementation-specific. The simplest logic is to check if message priority is within the "throttle priority" configured in Table 4, then message should not be allowed.
    a. Table 4 provides examples of mappings between the threshold levels and throttle priorities.
    b. If a message fails to run a validation check against a threshold level, then the action configured for the UE/SCS will be applied, i.e.,
        i. If notification is received for a UE for which a record is present in Table 2 then apply corresponding "Discard"/"Buffer policy.
        ii. Otherwise, SCS/AS policy should be applied to determine the behavior of message.
        iii. Terminate the flow here.
4. Verify if the message is allowed through threshold level(s) of the SCS/AS.
    Like step #3, if message fails to pass the threshold level check, then apply "Discard"/"Buffer" policy as defined for corresponding UE/SCS.
5. Send the message to API gateway that will deliver the message to corresponding SCS/AS.
6. Increment the counter maintained to track API gateway load level and SCS/AS load level.

Figure 4:
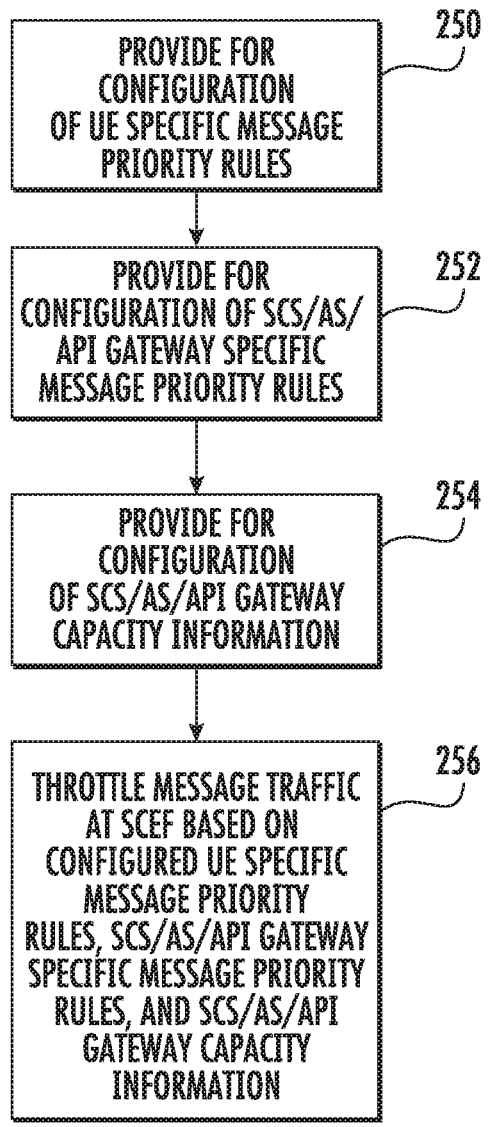
FIG. 4 is a flow chart illustrating an exemplary process for flow control at an SCEF.

FIG. 4 is a flow chart illustrating an exemplary process for overload or flow control performed by an SCEF 122. Referring to FIG. 4, in step 250, SCEF 122 provides for configuration of UE specific message priority rules. For example, SCEF 122 may provide for configuration of rules specific to a UE device or UE device group, such as those illustrated in Table 2. Providing for UE specific message priority rules may include providing for assignment of priorities to messages from specific UE devices or UE device groups such that messages from the UE devices or device groups are processed according to UE specific or UE device group specific priority rules. In one example, the UE device specific or UE device group specific priory rules may include rules identifying UE device or UE device groups corresponding to priority users, such as emergency personnel, law enforcement personnel, or government personnel In step 252, SCEF 122 provides for configuration of SCS/AS/API gateway specific message priority rules. In general, providing for configuration of priority rules may include providing an administrative interface to SCEF 122 through which the user or operator of SCEF 122 can provision one or more databases accessible by congestion controllers 220 to identify overload conditions and determine which message priority rules to apply when an overload condition occurs. For example, SCEF 122 may provide for assignment of different Diameter message routing protocol (DRMP) message priorities to different message types (see Table 1). Stated differently, providing for configuration of SCS, AS, and API gateway specific message priority rules may include providing for assignment of message types to priority levels on an SCS, AS, and API gateway specific basis. As illustrated in Table 1, for different SCSs, the same message types may be assigned different priorities. For example, for SCS1, monitoring traffic is assigned priority level 13, and for SCS2, monitoring traffic is assigned priority level P4. Because priority level 4 is higher than priority than priority level 14 according to the DRMP message priority scheme, SCS1 will drop monitoring traffic when a lower traffic rate threshold is crossed than SCS2. It should be noted that in Table 1, message priorities for different SCSs may be set differently. Also, even though not illustrated in Table 1, different priorities may be defined per AS and per API gateway.

Returning to FIG. 4, in step 254, SCEF 122 provides for configuration of SCS, AS, and API gateway capacity information. For example, SCEF 122 may provide for configuration of SCS, AS, and API gateway message processing capacity information, such as that illustrated in Table 3. Providing for configuration of SCS, AS, and API gateway capacity information may include providing for configuration of different message processing capacities for each SCS, AS, or API gateway associated with SCEF 122. For each SCS, AS, or API gateway, the capacity that is configured may be a number of messages that the SCS, AS, or API gateway is capable of processing within a measurement time period. For each SCS, AS, or API gateway, threshold levels corresponding to different numbers of messages may be configured, where each of the threshold levels corresponds to a different percentage of the processing capacity of the SCS, AS, or API gateway.

In step 256, message traffic is throttled at the SCEF based on UE specific message priority rules, SCS/AS/API gateway specific message priority rules, and SCS/AS/API gateway capacity information. As stated above, the following steps may be performed for messages received on the T6a or T6b interface that are directed to the T8 interface. Based on the configured threshold level of API gateway and the priority of the message, perform a check to determine if message is allowed to be sent to the API gateway. Determining whether a message is allowed to be sent to the API gateway may include calculating the traffic rate for the API gateway and comparing the traffic rate to the threshold levels configured to the API gateway. If one of the threshold levels is crossed, the throttle priorities corresponding to the threshold level are determined. It is then determined whether the message type is allowed to be sent to the API gateway based on the throttle priorities. As stated above, the throttle priorities define which priority levels of messages will be subject to flow control. The message type may be used to determine the priority of the message, and data similar to that illustrated in Table 1 may be used to determine whether the message type is allowed to be forwarded to the API gateway given the current congestion level of the API gateway. Thus, one type of throttling performed includes throttling received message destined for an SCS or AS based on API gateway specific capacity information.

Assuming the message is allowed to be sent to the API gateway, it is then determined whether any UE specific priority rules apply. UE specific priority rules may include forwarding messages from high priority users regardless of the congestion status of the AS or SCS. Another example of a UE specific priority rule may include a rule that blocks message from a UE device or device group identified as attackers or misbehaving devices. If a UE specific priority rule applies, then SCEF 122 forwards, buffers, or discards the message based on the applicable UE specific priority rule.

If a UE specific priority rule does not govern the processing of the message, the destination SCS or AS for the message is identified, and the traffic rate for the SCS or AS is determined. It is then determined whether the traffic rate crosses one of the thresholds configured for the destination SCS or AS. If the traffic rate crosses one of the thresholds configured for the SCS or AS, the throttle priorities corresponding to the threshold level are determined. As stated above, the throttle priorities indicate which priority levels of messages will be subject to flow control. The priority level of the message is determined based on the feature priority mappings for the SCS or AS.

The message type is determined. The throttle priorities, the message type, and the treatment assigned to the message type are then used to determine how to process the message. For example, if the traffic rate crosses threshold level 1 for SCS1, the throttle priorities are P12-P15 using the data in Table 4, which means that messages with priorities P12-P15 will be subject to flow control. If the message type is monitoring, using the data in Table 1, monitoring messages will be discarded.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method for overload and flow control at a service capability exposure function (SCEF), the method comprising:
   providing for configuration of, in memory accessible by the SCEF, at least one of user equipment (UE), service capability server (SCS), application server (AS), and application programming interface (API) gateway specific message priority rules;
   providing for configuration of, in the memory accessible by the SCEF, at least one of SCS, AS, and API gateway capacity information; and
   throttling message traffic at the SCEF based on the at least one of UE, SCS, AS, and API gateway specific message priority rules, and the at least one of SCS, AS, and API gateway capacity information.

2. The method of claim 1 wherein providing for configuration of at least one of UE, SCS, AS, and API gateway specific message priority rules includes providing for configuration of rules specific to UE devices or UE device groups such that messages from the UE devices or device groups are processed according to UE specific or UE device group specific priority rules.

3. The method of claim 1 wherein providing for configuration of at least one of UE, SCS, AS, and API gateway specific message priority rules includes providing for assignment of message types to priority levels on a per SCS, AS, and API gateway specific basis.

4. The method of claim 1 wherein providing for configuration of at least one of SCS, AS, and API gateway capacity information includes providing for configuration of different message processing capacities for each API gateway, SCS, and AS associated with the SCEF.

5. The method of claim 1 wherein throttling the message traffic at the SCEF includes receiving a message destined for an SCS or AS, calculating a traffic rate for the SCS, AS, or API gateway, determining whether the traffic rate exceeds a threshold defined for the SCS, AS, or API gateway, and in response to determining that the traffic rate exceeds the threshold, applying one of the SCS, AS, or API gateway specific message priority rules to determine how to process the message.

6. The method of claim 5 comprising receiving a message from an SCS or AS on a T8 interface and incrementing a counter used to calculate the traffic rate for an API gateway.

7. The method of claim 1 wherein providing for configuration of at least one of SCS, AS, and API gateway specific message priority rules includes providing for assignment of different Diameter message routing protocol (DRMP) message priorities to different message types.

8. The method of claim 1 wherein throttling message traffic using the at least one of SCS, AS, and API gateway specific capacity information includes providing for configuration of a plurality of different threshold levels and mappings of the different threshold levels to different throttle priorities.

9. The method of claim 8 wherein the throttle priorities define, for each of the threshold levels, message priority levels that are subject to flow control.

10. The method of claim 9 wherein throttling the message traffic includes determining whether to pass, discard or buffer a received message based on whether a traffic rate calculated for an SCS, AS, or API gateway exceeds a threshold level defined for the SCS, AS, or API gateway, the throttle priorities configured for the threshold level, and a message type of the received message.

11. A system for overload and flow control at a service capability exposure function (SCEF), the system comprising:
    an SCEF including at least one message processor for receiving messages destined for a service capability server (SCS) or an application server (AS), and at least one message processor implementing an application programming interface (API) gateway for the SCS or AS; and
    a congestion controller for providing for configuration of, in memory accessible by the SCEF, at least one of user equipment (UE), SCS, AS, and API gateway specific message priority rules, providing for configuration of, in the memory accessible by the SCEF, at least one of SCS, AS, and API gateway capacity information and throttling message traffic at the SCEF based on the at least one of UE, SCS, AS, and API gateway specific message priority rules, and the at least one of SCS, AS, and API gateway capacity information.

12. The system of claim 11 wherein providing for configuration of at least one of UE, SCS, AS, and API gateway specific message priority rules includes providing for configuration of rules specific to UE devices or UE device groups such that messages from the UE devices or device groups are processed according to UE specific or UE device group specific priority rules.

13. The system of claim 11 wherein providing for configuration of at least one of SCS, AS, and API gateway specific message priority rules includes providing for assignment of message types to priority levels on a per SCS, AS, and API gateway specific basis.

14. The system of claim 11 wherein providing for configuration of at least one of SCS, AS, and API gateway capacity information includes providing for configuration of different message processing capacities for each API gateway, SCS, and AS associated with the SCEF.

15. The system of claim 11 wherein throttling the message traffic at the SCEF includes receiving a message destined for an SCS or AS, calculating a traffic rate for the SCS, AS, or API gateway, determining whether the traffic rate exceeds a threshold defined for the SCS, AS, or API gateway, and in response to determining that the traffic rate exceeds the threshold, applying one of the SCS, AS, or API gateway specific message priority rules to determine how to process the message.

16. The system of claim 15 wherein the SCEF is configured to receive a message from an SCS or AS on a T8 interface and increment a counter used to calculate the traffic rate for an API gateway.

17. The system of claim 11 wherein providing for configuration of at least one of SCS, AS, and API gateway specific message priority rules includes providing for assignment of different Diameter message routing protocol (DRMP) message priorities to different message types.

18. The system of claim 11 wherein throttling message traffic using the at least one of SCS, AS, and API gateway specific capacity information includes providing for configuration of a plurality of different threshold levels and mappings of the different threshold levels to different throttle priorities, which define, for each of the threshold levels, message priority levels that are subject to flow control.

19. The system of claim 18 wherein throttling the message traffic includes determining whether to pass, discard, or buffer a received message based on whether a traffic rate calculated for an SCS, AS, or API gateway exceeds a threshold level defined for the SCS, AS, or API gateway, the throttle priorities configured for the threshold level, and a message type of the received message.

20. A non-transitory computer readable medium having stored thereon executable instructions that when executed by a processor of a computer control the computer to perform steps comprising:
at a service capability exposure function (SCEF):
providing for configuration of, in memory accessible by the SCEF, at least one of user equipment (UE), service capability server (SCS), application server (AS), and application programming interface (API) gateway specific message priority rules;
providing for configuration of, in memory accessible by the SCEF, at least one of SCS, AS, and API gateway capacity information; and
throttling message traffic at the SCEF based on the at least one of UE, SCS, AS, and API gateway specific message priority rules, and the at least one of SCS, AS, and API gateway capacity information.

\* \* \* \* \*

UNITED STATES PATENT AND TRADEMARK OFFICE
CERTIFICATE OF CORRECTION

PATENT NO. : 10,616,802 B2
APPLICATION NO. : 16/121203
DATED : April 7, 2020
INVENTOR(S) : Krishan et al.

Page 1 of 1

It is certified that error appears in the above-identified patent and that said Letters Patent is hereby corrected as shown below:

On the Title Page

Page 3, Column 1, Line 27, delete "ETSl" and insert -- ETSI --, therefor.

Page 3, Column 1, Line 43, delete "inten/vorking" and insert -- interworking --, therefor.

Page 3, Column 2, Line 11, delete "Applicatons" and insert -- Applications --, therefor.

Page 3, Column 2, Line 12, delete "3FPP" and insert -- 3GPP --, therefor.

In the Specification

Column 2, Line 65, delete "as" and insert -- ASs --, therefor.

Column 3, Line 62, delete "as" and insert -- ASs --, therefor.

Column 9, Line 3, delete "As" and insert -- as --, therefor.

Column 10, Line 7, after "personnel" insert -- . --.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*